No. 809,259. PATENTED JAN. 2, 1906.
J. HIST.
POTATO DIGGER.
APPLICATION FILED MAY 4, 1905.
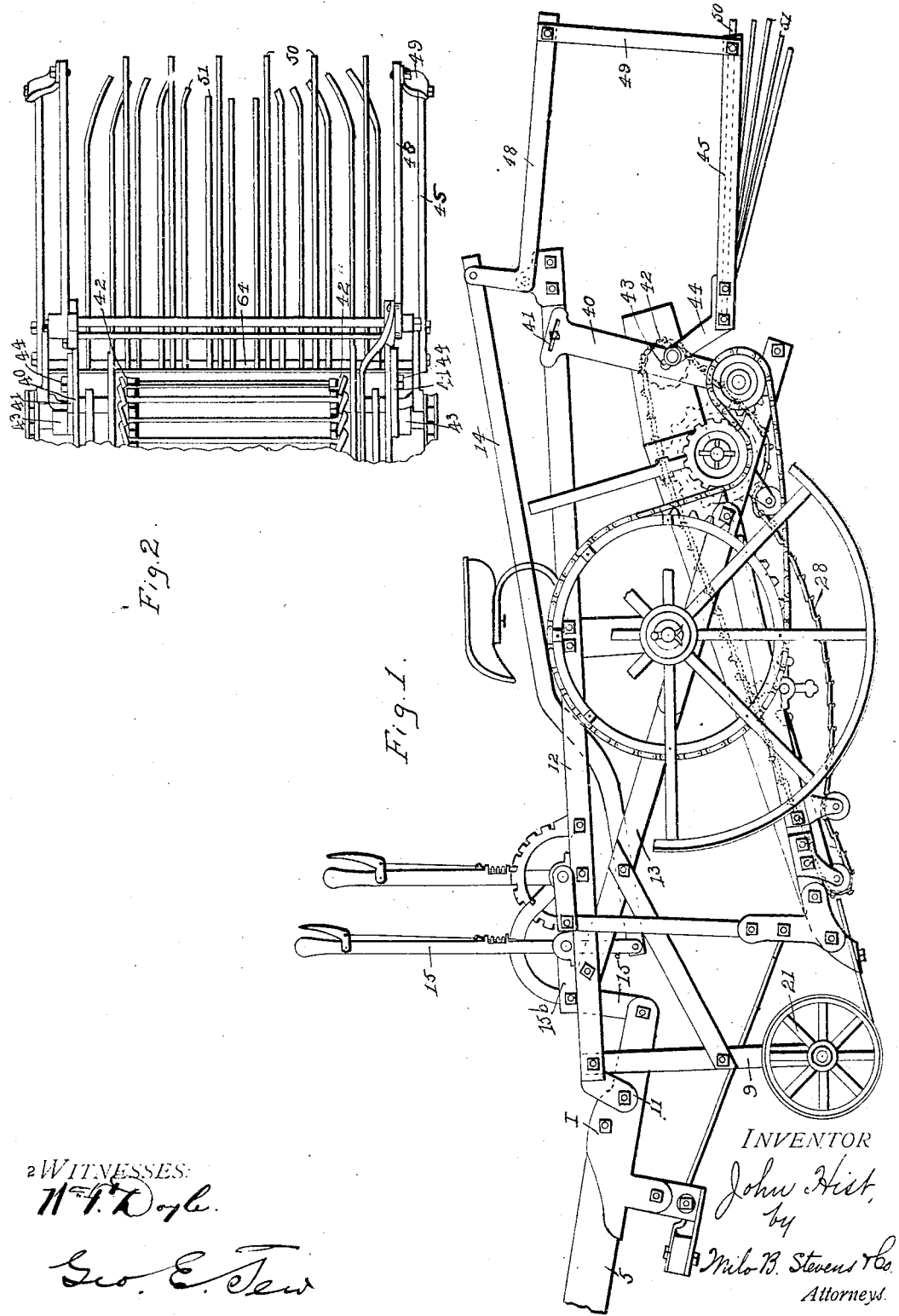
INVENTOR
John Hist,
by
Milo B. Stevens & Co.
Attorneys.
2 WITNESSES:
W. F. Doyle.
Geo. E. Tew.

UNITED STATES PATENT OFFICE.

JOHN HIST, OF SOLON, OHIO.

POTATO-DIGGER.

No. 809,259.         Specification of Letters Patent.         Patented Jan. 2, 1906.

Original application filed February 11, 1905, Serial No. 245,208. Divided and this application filed May 4, 1905. Serial No. 258,809.

*To all whom it may concern:*

Be it known that I, JOHN HIST, a citizen of the United States, residing at Solon, in the county of Cuyahoga and State of Ohio, have invented new and useful Improvements in Potato-Diggers, of which the following is a specification.

This application is a division of my pending application, Serial No. 245,208, filed February 11, 1905, for potato-digger; and the present specification and claims relate especially to the shaker which receives the potatoes and material from an endless carrier. Novelty is claimed with respect to the construction of the shaker and also with respect to the means by which it is supported and operated.

In the accompanying drawings, Figure 1 is a side elevation of a potato-digging machine provided with the invention. Fig. 2 is a top plan view thereof, partly broken away.

In the following specification the description will be limited to the shaker and its associated parts claimed herein, together with only such other parts of the machine as may be necessary to the full understanding of this invention.

In the drawings, 5 indicates a tongue the socket-piece I of which is hinged to the upper bars 12 of the main frame at 11.

21 indicates gage-wheels which are carried by arms 9, depending from the upper bars 12. The rear end of the socket-piece I is connected by a link 15$^a$ to an arm 15$^b$, projecting from the rock-shaft of the hand-lever 15. It will thus be seen that the tongue forms a lever, and when the hand-lever 15 is swung back the rear end of the tongue and the front end of the machine are lifted. The hand-lever 15 is also connected by a rod 14 to a bent lever 48, which carries the shaker at the rear end of the machine, so that when the front end of the machine is lifted or lowered the shaker is also lifted or lowered with one operation of the hand-lever 15.

The shaker-shaft 43 is carried by arms 40, which are hinged at the lower end to the rear ends of bars 13, forming part of the main frame of the machine, and are connected at the upper end to the rear ends of the frames 12 by slot-and-bolt connection at 41. The shaft 43 carries sprockets 42, which are driven by the carrier-belts 28 from the main wheels of the machine by means unnecessary to describe here. The shaft 43 is cranked at the ends, and these cranks carry and operate the arms 44, which support the two side frames 45 of the shaker. The rear ends of these frames are connected by links 49 to the bent lever 48, heretofore referred to.

By means of the cranks the shaker is vibrated, the links 49 swinging to allow the motion. The shaker is adapted especially to separate the potatoes from the vines and such other trash. The shaker has a series of grass-rods 50, below which are the potato-rods 51. The former extend out straight from the angle-iron 64, by which they are supported; but the latter are dished toward the middle. The angle-iron 64 extends between the opposite arms 44 and is supported thereby. The grass-rods serve to separate the vines and trash from the potatoes, and the dished arrangement of the potato-rods causes them to gather the potatoes together into a narrow row as they drop to the ground. When the lever 15 is pulled back, the front end of the frame swings up, and by means of the connection 14 the shaker at the rear is also tilted up. This clears the latter from the ground and prevents it from being broken or damaged while turning around or backing up.

What I claim as new, and desire to secure by Letters Patent, is—

1. In a potato-digger, in combination, a frame having upper and lower bars, arms hinged to the rear ends of the lower bars and adjustably connected to the rear ends of the upper bars, a shaft carried by said arms and having cranks at the ends, and a shaker suspended from the upper bars and connected to the cranks.

2. In a potato-digger, in combination, a frame having upper bars, arms depending from said bars, a crank-shaft carried by said arms, a shaker hung at the front end from said cranks, and levers fulcrumed on the rear ends of the bars and connected by links to the rear end of the shaker.

In testimony whereof I have signed my name to this specification in the presence of two subscribing witnesses.

JOHN HIST.

Witnesses:
    JOHN A. BOMMHARDT,
    LOTTIE NEWBURN.